United States Patent
Kawabata

(10) Patent No.: US 10,717,860 B2
(45) Date of Patent: Jul. 21, 2020

(54) POLYVINYL CHLORIDE-BASED RESIN MOLDED PRODUCT AND METHOD FOR MANUFACTURING THE SAME

(71) Applicant: Shin-Etsu Chemical Co., Ltd., Tokyo (JP)

(72) Inventor: Toshiki Kawabata, Kamisu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 68 days.

(21) Appl. No.: 16/144,083

(22) Filed: Sep. 27, 2018

(65) Prior Publication Data

US 2019/0112463 A1 Apr. 18, 2019

(30) Foreign Application Priority Data

Oct. 13, 2017 (JP) ................. 2017-198973

(51) Int. Cl.
*C08L 27/06* (2006.01)
*C08K 3/26* (2006.01)
*C08L 51/04* (2006.01)

(52) U.S. Cl.
CPC ........... *C08L 27/06* (2013.01); *C08K 3/26* (2013.01); *C08L 51/04* (2013.01); *C08K 2003/265* (2013.01); *C08K 2201/005* (2013.01); *C08L 2203/16* (2013.01); *C08L 2203/18* (2013.01)

(58) Field of Classification Search
CPC .... C08L 51/04; C08L 27/06; C08K 2003/265
See application file for complete search history.

(56) References Cited

U.S. PATENT DOCUMENTS

| 3,864,429 A | 2/1975 | Tanaka et al. |
| 5,610,219 A * | 3/1997 | Takatani ................. C08K 7/02 385/100 |
| 2018/0244908 A1 * | 8/2018 | Rachwal ................. C09C 1/021 |
| 2018/0305574 A1 * | 10/2018 | Tissier ..................... C09D 4/06 |
| 2019/0062543 A1 * | 2/2019 | Sasada ..................... C08K 3/26 |

FOREIGN PATENT DOCUMENTS

| CN | 106916394 A | 7/2017 |
| JP | 51-25062 B2 | 7/1976 |
| JP | 2014-231565 A | 12/2014 |
| WO | 2005/047382 A1 | 5/2005 |
| WO | 2018/086159 A1 | 5/2018 |

OTHER PUBLICATIONS

Extended European Search Report dated Feb. 18, 2019, issued in counterpart EP Application No. 18197478.3. (7 pages).

* cited by examiner

*Primary Examiner* — Jeffrey C Mullis
(74) *Attorney, Agent, or Firm* — Westerman, Hattori, Daniels & Adrian, LLP

(57) ABSTRACT

The present invention provides a polyvinyl chloride-based resin molded product obtained by molding a resin mixture containing 3 to 15 parts by weight of calcium carbonate having an average primary particle size of 0.01 to 0.3 μm and 2 to 4 parts by weight of an impact modifier per 100 parts by weight of a polyvinyl chloride-based resin, wherein a Charpy impact strength at 23° C. is 20 kJ/m² or more, and a weight reduction ratio is 1.5 mg/cm² or less when the molded product is immersed in a 93% by weight sulfuric acid aqueous solution for 14 days in accordance with JIS K 6745, and a method for manufacturing the polyvinyl chloride-based resin molded product.

4 Claims, No Drawings

POLYVINYL CHLORIDE-BASED RESIN MOLDED PRODUCT AND METHOD FOR MANUFACTURING THE SAME

CROSS-REFERENCE TO RELATED APPLICATION

This non-provisional application claims priority under 35 U.S.C. § 119(a) on Patent Application No. 2017-198973 filed in Japan on Oct. 13, 2017, the entire contents of which are hereby incorporated by reference.

TECHNICAL FIELD

The present invention relates to a polyvinyl chloride-based resin molded product containing an impact modifier and calcium carbonate and a method for manufacturing the polyvinyl chloride-based resin molded product.

BACKGROUND ART

Conventionally, a molded product using a polyvinyl chloride-based resin has been molded by a method such as extrusion molding, press molding, injection molding, or calender molding, and has been widely used for various products such as a pipe, a joint, a drainage basin, a gutter, a window frame, a siding, a film-sheet material, a flat plate, and a corrugated plate.

In the molded product, a methyl methacrylate-butadiene-styrene graft copolymer (MBS polymer), an acrylic rubber, or the like is often used as an impact modifier. Examples thereof include Patent Document 1 listed below. However, compounding of the above impact modifier causes a problem such as a decrease in softening temperature, and further causes an increase in cost.

Therefore, Patent Document 2 listed below is an example in which the addition amount of the impact modifier is suppressed by containing calcium carbonate. However, dispersibility of calcium carbonate in a molded product is insufficient, and therefore an impact strength modifying effect thereof is limited. Furthermore, addition of a large amount of calcium carbonate is necessary, and therefore this leads to deterioration in physical properties of a molded product, such as chemical resistance.

CITATION LIST

Patent Document 1: JP-B S51-25062
Patent Document 2: JP-A 2014-231565

SUMMARY OF THE INVENTION

The present invention has been achieved in view of the above circumstances. An object of the present invention is to provide a polyvinyl chloride-based resin molded product minimizing the addition amount of an impact modifier causing a decrease in softening temperature and an increase in cost and the addition amount of calcium carbonate causing deterioration in physical properties such as chemical resistance, and having excellent impact resistance, and a method for manufacturing the polyvinyl chloride-based resin molded product.

As a result of intensive studies to achieve the above object, the present inventor has found that a molded product of a resin mixture containing 3 to 15 parts by weight of calcium carbonate having an average primary particle size of 0.01 to 0.3 μm and 2 to 4 parts by weight of an impact modifier per 100 parts by weight of a polyvinyl chloride-based resin, particularly preferably the above molded product obtained by a molding method for promoting uniform dispersion of calcium carbonate has excellent chemical resistance in addition to impact resistance, and has completed the present invention.

Therefore, the present invention provides the following polyvinyl chloride-based resin molded product and a method for manufacturing the polyvinyl chloride-based resin molded product.

1. A polyvinyl chloride-based resin molded product obtained by molding a resin mixture containing 3 to 15 parts by weight of calcium carbonate having an average primary particle size of 0.01 to 0.3 μm and 2 to 4 parts by weight of an impact modifier per 100 parts by weight of a polyvinyl chloride-based resin, wherein a Charpy impact strength at 23° C. is 20 $kJ/m^2$ or more, and a weight reduction ratio is 1.5 $mg/cm^2$ or less when the molded product is immersed in a 93% by weight sulfuric acid aqueous solution for 14 days in accordance with JIS K 6745.

2. The polyvinyl chloride-based resin molded product of 1 above, wherein the impact modifier is at least one polymer material selected from the group consisting of a methyl methacrylate-butadiene-styrene graft copolymer (MBS polymer), an acrylic rubber, and a chlorinated polyethylene.

3. The polyvinyl chloride-based resin molded product of 1 above, used for a product selected from the group consisting of a pipe, a fitting, a drainage basin, a gutter, a window frame, a siding, a film-sheet material, a flat plate, and a corrugated plate.

4. A method for manufacturing a polyvinyl chloride-based resin molded product, wherein a resin mixture containing 3 to 15 parts by weight of calcium carbonate having an average primary particle size of 0.01 to 0.3 μm and 2 to 4 parts by weight of an impact modifier per 100 parts by weight of a polyvinyl chloride-based resin is mixed at a rotation-speed of 500 to 3,000 rpm and molded by a molding method selected from the group consisting of extrusion molding, press molding, injection molding, and calender molding to obtain a resin molded product in which a Charpy impact strength at 23° C. is 20 $kJ/m^2$ or more, and a weight reduction ratio is 1.5 $mg/cm^2$ or less when the molded product is immersed in a 93% by weight sulfuric acid aqueous solution for 14 days.

Advantageous Effects of the Invention

A polyvinyl chloride-based resin molded product according to an aspect of the present invention can suppress a decrease in softening temperature and deterioration in chemical resistance, has excellent impact resistance, and is used advantageously for various applications.

DESCRIPTION OF THE PREFERRED EMBODIMENT

Hereinafter, the present invention is described in more detail.

A polyvinyl chloride-based resin molded product according to an aspect of the present invention contains a polyvinyl chloride-based resin, an impact modifier, and calcium carbonate having a predetermined average primary particle size in predetermined amounts.

The polyvinyl chloride-based resin used in the present invention is a vinyl chloride homopolymer, a copolymer of a vinyl chloride monomer and a monomer copolymerizable with vinyl chloride (usually a copolymer containing 50% by weight or more of vinyl chloride), or a chlorinated vinyl chloride copolymer. Examples of the monomer copolymerizable with vinyl chloride include a vinyl ester such as vinyl acetate or vinyl propionate, acrylic acid, an acrylate such as ethyl acrylate, a methacrylate such as methyl methacrylate or ethyl methacrylate, an olefin monomer such as ethylene or propylene, acrylonitrile, styrene, and vinylidene chloride. The polyvinyl chloride-based resin has an average polymerization degree preferably of 500 to 1,500, more preferably of 700 to 1,300. With the average polymerization degree of less than 500, impact strength is low, and requirement cannot be satisfied. With the average polymerization degree of more than 1,500, melt viscosity is high, and molding is difficult. Note that the average polymerization degree of the polyvinyl chloride-based resin is a value measured by a melt viscosity method defined in JIS K 7367-2.

Calcium carbonate used in the present invention has an average primary particle size of 0.01 to 0.3 µm, preferably of 0.05 to 0.2 µm. Generally, as calcium carbonate in this average primary particle size region, colloidal calcium carbonate synthesized by a chemical method using limestone as a raw material is commercially available. If the average primary particle size of calcium carbonate is within the above range, impact resistance of the polyvinyl chloride-based resin molded product can be improved. As the particle size of calcium carbonate decreases, the specific surface area thereof increases significantly, and it is considered that stress is diffused, and a microcraze is generated at a filler interface to absorb strain energy in a case where impact is applied. Note that the average primary particle size of calcium carbonate is measured by a transmission electron microscope photograph observation method.

In particular, as the calcium carbonate, calcium carbonate which has been subjected to surface treatment in advance and hardly agglomerates is preferably adopted. In this case, a surface-treated calcium carbonate has an average primary particle size of 0.01 to 0.3 µm. In a case of using calcium carbonate which has not been subjected to surface treatment, agglomeration tends to occur. If calcium carbonate agglomerates, an impact strength improving effect may be insufficient. In addition, calcium carbonate particles are desirably dispersed in a polyvinyl chloride-based resin molded product uniformly. Therefore, calcium carbonate has been desirably subjected to fatty acid surface treatment.

The fatty acid used in the surface treatment is preferably a higher fatty acid having 10 to 20 carbon atoms. Specifically, a fatty acid such as stearic acid, palmitic acid, lauric acid, or oleic acid is preferably used, and two or more kinds thereof may be mixed and used. Incidentally, as the fatty acid, not only a fatty acid but also a fatty acid salt with an alkali metal such as sodium or calcium, an alkaline earth metal, or the like, or a fatty acid ester may be used.

The compounding amount of calcium carbonate is 3 to 15 parts by weight, and preferably 5 to 12 parts by weight per 100 parts by weight of a polyvinyl chloride-based resin. If the compounding amount of calcium carbonate is within the above range, an impact strength modifying effect due to some interaction with an impact modifier is exerted most, and impact resistance of a polyvinyl chloride-based resin molded product can be improved. If the compounding amount of calcium carbonate is less than 3 parts by weight, an impact strength improving effect is hardly exerted. If the compounding to amount of calcium carbonate exceeds 15 parts by weight, a softening temperature significantly decreases, and chemical resistance is significantly deteriorated.

The impact modifier used in the present invention is at least one resin material selected from the group consisting of a methyl methacrylate-butadiene-styrene graft copolymer (MBS polymer), an acrylic rubber, and a chlorinated polyethylene. In a preferable form, the impact modifier is in a form of particles. Particles having an average particle size of 5 to 500 µm are preferably used.

The compounding amount of the impact modifier is 2 to 4 parts by weight per 100 parts by weight of a polyvinyl chloride-based resin. If the compounding amount of the impact modifier is less than 2 parts by weight, an effect of improving impact resistance is not sufficient. If the compounding amount of the impact modifier exceeds 4 parts by weight, various properties such as tensile strength and softening temperature are deteriorated.

As the above methyl methacrylate-butadiene-styrene graft copolymer (MBS polymer), those known in the technical field may be used. Among the compounds, a compound containing 40 to 85% by weight of butadiene in the resin is preferable. If the content of butadiene is less than 40% by weight, a sufficient impact resistance improving effect cannot be obtained. The content of butadiene of more than 85% by weight may deteriorate fluidity and tensile strength.

The particle size of the methyl methacrylate-butadiene-styrene graft copolymer is not particularly limited, but particles having an average particle size within a range of 10 to 350 µm are preferable.

As the acrylic rubber, those known in the technical field can be used. Examples thereof include a butyl acrylate rubber, a butadiene-butyl acrylate rubber, a 2-ethylhexyl acrylate-butyl acrylate rubber, a 2-ethylhexyl methacrylate-butyl acrylate rubber, a stearyl acrylate-butyl acrylate rubber, and a composite rubber of a silicone-based rubber or the like and an acrylate rubber. Examples of the silicone-based rubber in this case include a polydimethylsiloxane rubber. Examples thereof further include, in addition to a ternary copolymer obtained by adding methyl acrylate, ethylene, and a component having a carboxyl group, a core-shell rubber obtained by grafting methyl methacrylate, an acrylate, or the like to a rubbery core formed of styrene butadiene or an acrylate.

The chlorinated polyethylene preferably has a chlorine content of 25 to 50% by weight. A chlorinated polyethylene having a chlorine content of less than 25% by weight has poor rubber elasticity and poor impact resistance. A chlorinated polyethylene having a chlorine content of more than 50% by weight is too soft and may cause deterioration in heat resistance and tensile strength.

The chlorinated polyethylene is preferably amorphous, and particularly preferably has a Mooney viscosity ML (1+4) (121° C.) in a range of 70 to 120 from a viewpoint of improving impact resistance.

To the polyvinyl chloride-based resin molded product used in the present invention, a heat stabilizer for a chlorine-containing resin may be added in addition to these substances. This heat stabilizer is used for preventing discoloration of a molded product or deterioration of the molded product due to cutting of a molecular chain by thermal decomposition of a chlorine-containing resin and release of hydrogen chloride when a chlorine-containing resin composition is subjected to molding processing. As the heat stabilizer, those conventionally used for a polyvinyl chloride-based resin molded product can be used, and examples thereof include a metal compound such as calcium, barium, or zinc, a tin-based compound, and a lead-based compound. The compounding amount of the heat stabilizer is not particularly limited. However, the heat stabilizer can be used preferably in an amount of 20 parts by weight or less, more preferably in an amount of 1 to 10 parts by weight per 100 parts by weight of a polyvinyl chloride resin. A lubricant, a processing aid, an ultraviolet absorber, an antioxidant, a pigment, or the like may be added, if necessary. Each of these additives may be added in a range of 20 parts by weight or less.

As described above, in the present invention, the polyvinyl chloride resin, an impact modifier, and calcium carbonate are compounded in predetermined amounts. As a method for obtaining the resin mixture, by mixing the resin mixture with a rotary mixer at a specific rotational speed to mold the resin mixture, a molded product minimizing the addition amount of an impact modifier and the addition amount of calcium carbonate and having both impact resistance and chemical resistance can be obtained. Examples of the rotary mixer to be used include a Henschel mixer and a super mixer from a viewpoint of convecting and uniformly mixing the resin composition according to an aspect of the present invention.

The rotational speed of the rotary mixer is not particularly limited, but is preferably 500 to 3,000 rpm, and more preferably 1,000 to 2,500 rpm. In a case where this rotational speed is less than 500 rpm, agglomeration of calcium carbonate occurs due to poor dispersion of calcium carbonate, and a molded product having high impact strength cannot be obtained in some cases. Conversely, in a case where the rotational speed exceeds 3,000 rpm, it may be difficult to uniformly control a mixing temperature due to excessive heat generation. At the time of stirring by the mixer, rotation mixing is performed at the temperature of compounding materials of 10 to 40'C, preferably of 20 to 30° C. When the temperature of the compounding materials reaches 100 to 140° C., preferably 110 to 130° C. by raising the temperature, the compounding materials are discharged to obtain a powder compound of the resin mixture. In this case, the mixing time of the compounding materials may be set preferably to 0.05 to 1.0 hr, more preferably to 0.05 to 0.5 hr.

A method for molding the powder compound (resin mixture) (also referred to as "main molding") is not particularly limited, but is preferably selected from the group consisting of extrusion molding, press molding, injection molding, and calender molding.

Before the molding, the powder compound may be subjected to preliminary melt processing. Examples of this preliminary melt processing include a method using a product obtained by extrusion molding or roll molding and a method using a product obtained by pelletizing the molded product preferably to about 0.5 to 10 mm, more preferably to about 1 to 7 mm by chopping. Kneading is preferably performed at the preliminary melt processing set temperature of 140 to 200° C. for 2 to 12 minutes. In a case of preliminary melt processing using extrusion molding, for example, a powder compound is melted at 140 to 180° C. using an extrusion molding machine, a screw speed is controlled to 10 to 60 rpm such that a pellet has a length of about 0.5 to 10 mm in a longitudinal direction, and a pellet compound can be thereby obtained. In a case of roll molding, a powder compound is put into a two-roll (for example, 3 to 9 inches, about 10 to 30 rpm) and kneaded, for example, at 160 to 200° C. for 1 to 30 minutes, preferably for 1 to 10 minutes to obtain a thickness of 0.1 to 5 mm. By performing preliminary melt processing under such conditions, it is considered that calcium carbonate can be more uniformly dispersed at the time of subsequent main molding of the resin mixture.

After the preliminary melt processing, by molding the powder compound by the various molding methods described above, a polyvinyl chloride-based resin molded product as a main molded product can be obtained. As a specific example of this molding processing, by pressing a pellet having a desired weight or a roll sheet cut into a desired length under preferable conditions of 150 to 250° C., pressure of 10 to 100 kg/cm$^2$, and 1 to 30 minutes so as to obtain a desired shape, a pressed sheet (having a thickness preferably of 0.5 to 10 mm, more preferably of 3 to 5 mm) is molded to obtain a molded sheet. In main molding processing, not only press molding but also extrusion molding may be selected. In this case, a pelletized preliminarily melted product is put into an extruder. Control is performed such that a resin temperature is 140 to 200° C. and a rotational speed is 20 to 60 rpm, and an extrusion molded product such as a square rod or a sheet can be obtained.

The polyvinyl chloride-based resin molded product molded in the present invention has a Charpy impact strength preferably of 20 kJ/m$^2$ or more, more preferably of 40 kJ/m$^2$ or more, still more preferably of 50 kJ/m$^2$ or more. The Charpy impact strength is measured in accordance with JIS K 7111 under a condition of 23±2° C. If the Charpy impact strength is less than 20 kJ/m$^2$, cracking easily occurs at the time of use.

As chemical resistance of the polyvinyl chloride-based resin molded product, a weight reduction ratio is preferably 1.5 mg/cm$^2$ or less, and more preferably 1.0 mg/cm$^2$ or less when the molded product is immersed in a 93% by weight sulfuric acid aqueous solution at 55° C. for 14 days in accordance with JIS K 6745. If the weight reduction ratio exceeds 1.5 mg/cm$^2$, defects due to erosion are easily generated in use under an acidic atmosphere, leading to destruction of the molded product.

The molded product according to an aspect of the present invention can be preferably used for various industrial products such as a pipe, a joint, a drainage basin, a gutter, a window frame, a film-sheet material, a flat plate, and a corrugated plate. Impact resistance and chemical resistance required for these industrial products vary depending on environments in which the industrial products are used. Therefore, impact resistance and chemical resistance required are appropriately selected in consideration of a use environment and a processing step.

EXAMPLES

Hereinafter, the present invention is described specifically with reference to Examples and Comparative Examples, but the present invention is not limited to the following Examples.

Examples 1 to 15

(1) Preparation of Polyvinyl Chloride-Based Resin Compound

Using a polyvinyl chloride resin "TK-1000 (average polymerization degree: 1,000)" manufactured by Shin-Etsu Chemical Co., Ltd., commonly used in all the Examples, calcium carbonate having a predetermined average primary particle size, an impact modifier, a heat stabilizer, and a lubricant were added such that the compounding materials and compounding amounts (parts by weight) were as illustrated in Tables 1 and 2. Using a 10 L Henschel mixer (FM10C/type 1) manufactured by Nippon Coke & Engineering Co., Ltd. as a rotary mixer, the resulting mixture was blended for 0.1 hours while being rotated and mixed at a rotation speed of 1,800 rpm (provided that the rotation speed in Example 12 was 2,400 rpm and the rotation speed in Example 13 was 1,200 rpm), and a polyvinyl chloride-based resin compound was discharged at 120° C. Note that an ST blade (standard) was used as an upper blade, and an AO blade (standard) was used as a lower blade in the Henschel mixer.

(2) Preparation of Roll Sheet (Preliminary Melt Processing)

The polyvinyl chloride-based resin compound obtained above was kneaded with a 6 inch two-roll for five minutes by performing control under conditions of a roll temperature of 170° C. and 20 rpm to form a roll sheet having a thickness of 0.7 mm.

(3) Preparation of Press Sheet (Main Molding Processing)

The roll sheet (thickness: 0.7 mm) was cut into a desired length, stacked so as to obtain desired parts by weight, and pressed under conditions of 180° C., pressure of 50 kg/cm$^2$, and five minutes to obtain a pressed sheet having a desired thickness.

Example 16

A polyvinyl chloride-based resin compound was prepared in a similar manner to Example 1. However, preliminary melt processing and main molding processing were performed by the following methods to prepare an extrusion molded product.

<Preparation of Extruded Pellet (Preliminary Melt Processing)>

Using the prepared powder compound, an extruded pellet was prepared with a 50 mmϕ single-screw extruder. An extruded pellet was prepared using a 50 mmϕ single-screw extruder of L/D=25 at a screw compression ratio CR: 2.5 with a screen: #60×1 sheet at a screw rotation speed: 40 rpm at cylinder setting temperatures of C1: 140° C. C2: 150° C., C3: 155° C., and C4: 160° C. (C1 was closest to a hopper, and then the powder compound passed through C2, C3, and C4 in this order) at a die setting temperature of 160° C.

<Preparation of Extrusion Molded Product (Main Molding Processing)>

Using the prepared extruded pellet, extrusion molding was performed with a 15 mmϕ different direction twin-screw extruder. Extrusion molding was performed using a 15 mmϕ different direction twin-screw extruder of L/D=30 at a screw compression ratio CR: 2.5 with a die: 4×10 mm square bar at a screw rotation speed: 40 rpm at cylinder setting temperatures of C1: 140° C., C2: 150° C., C3: 160° C., and C4: 170° C. (C1 was closest to a hopper, and then the pellet passed through C2, C3, and C4 in this order) at a die setting temperature of 180° C.

Example 17

A polyvinyl chloride-based resin compound was prepared in a similar manner to Example 1. However, preliminary melt processing was not performed, and main molding processing was performed using a powder compound in a similar manner to Example 16.

Comparative Example 1

The procedure was performed in a similar manner to that in Example 1 except that the rotation speed of the 10 L Henschel mixer (FM10C/type 1) was 400 rpm.

Comparative Example 2

The procedure was performed in a similar manner to that in Example 1 except that calcium carbonate was not compounded at all.

Comparative Examples 3 and 4

The procedure was performed in a similar manner to that in Example 1 except that calcium carbonate was not compounded at all and that the type of impact modifier was changed as illustrated in Table 3.

Comparative Example 5

The procedure was performed in a similar manner to that in Example 1 except that the compounding amount of calcium carbonate was 20 parts by weight per 100 parts by weight of a polyvinyl chloride resin.

Comparative Example 6

The procedure was performed in a similar manner to that in Example 1 except that no type of impact modifier was compounded at all.

The molded products in the above Examples and Comparative Examples were evaluated for Charpy impact strength and chemical resistance by the following methods.

<Charpy Impact Strength>

A Charpy impact test was performed at 23° C. in accordance with JIS K 7111 to measure impact strength. A case where the Charpy impact strength was 20 kJ/m$^2$ or more was evaluated as "O", and a case where the Charpy impact strength was less than 20 kJ/m$^2$ was evaluated as "X". The measured values and evaluation are illustrated in Tables 1 and 2 (Examples) and Table 3 (Comparative Examples).

<Chemical Resistance>

A weight reduction ratio was determined when a molded product in each example was immersed in a 93% by weight sulfuric acid aqueous solution at 55° C. for 14 days in accordance with JIS K 6745. A case where the weight reduction ratio of a molded product in each Example was 1.5 mg/cm$^2$ or less was evaluated as "O", and a case where the weight reduction ratio of a molded product in each example was more than 1.5 mg/cm$^2$ was evaluated as "X". The measured values and evaluation are illustrated in Tables 1 and 2 (Examples) and Table 3 (Comparative Examples).

TABLE 1

| | | | Example | | | | | | | |
|---|---|---|---|---|---|---|---|---|---|---|
| | | | 1 | 2 | 3 | 4 | 5 | 6 | 7 | 8 |
| Resin compounding (parts by weight) | Polyvinyl chloride resin | | 100 | 100 | 100 | 100 | 100 | 100 | 100 | 100 |
| | Calcium carbonate | (I) Particle size 0.15 μm | 3 | 5 | 8 | 10 | 12 | 15 | 5 | 10 |
| | | (II) Particle size 0.10 μm | | | | | | | | |

TABLE 1-continued

| | | Example | | | | | | | |
|---|---|---|---|---|---|---|---|---|---|
| | | 1 | 2 | 3 | 4 | 5 | 6 | 7 | 8 |
| Impact modifier | (III) Particle size 0.08 μm | | | | | | | | |
| | Acrylic rubber | 3 | 3 | 3 | 3 | 3 | 3 | | |
| | MBS polymer | | | | | | | 3 | 3 |
| | Chlorinated polyethylene | | | | | | | | |
| Heat stabilizer | Sn-based stabilizer | 2 | 2 | 2 | 2 | 2 | 2 | 2 | 2 |
| | Ca soap | 2 | 2 | 2 | 2 | 2 | 2 | 2 | 2 |
| Lubricant | Paraffin wax | 1 | 1 | 1 | 1 | 1 | 1 | 1 | 1 |
| | Polyethylene wax | 0.15 | 0.15 | 0.15 | 0.15 | 0.15 | 0.15 | 0.15 | 0.15 |
| Manufacturing conditions | Mixer rotation speed (rpm) | 1,800 | 1,800 | 1,800 | 1,800 | 1,800 | 1,800 | 1,800 | 1,800 |
| | Preliminary melt processing | Roll | Roll | Roll | Roll | Roll | Roll | Roll | Roll |
| | Main molding processing | Press | Press | Press | Press | Press | Press | Press | Press |
| Evaluation of physical properties | Charpy impact strength (kJ/m$^2$) | 20.6 ○ | 62.2 ○ | 85.1 ○ | 95.1 ○ | 82.4 ○ | 76.5 ○ | 22.4 ○ | 89.5 ○ |
| | Chemical resistance: weight reduction ratio (mg/cm$^2$) | 0.38 ○ | 0.52 ○ | 0.71 ○ | 0.86 ○ | 1.12 ○ | 1.32 ○ | 0.49 ○ | 0.91 ○ |

TABLE 2

| | | Example | | | | | | | | |
|---|---|---|---|---|---|---|---|---|---|---|
| | | 9 | 10 | 11 | 12 | 13 | 14 | 15 | 16 | 17 |
| Resin compounding (parts by weight) | Polyvinyl chloride resin | 100 | 100 | 100 | 100 | 100 | 100 | 100 | 100 | 100 |
| Calcium carbonate | (I) Particle size 0.15 μm | 10 | | | | 10 | 10 | 10 | 10 | 10 |
| | (II) Particle size 0.10 μm | | 10 | | | | | | 10 | |
| | (III) Particle size 0.08 μm | | | 10 | | | | | | |
| Impact modifier | Acrylic rubber | | 3 | 3 | 3 | 3 | 2 | 4 | 3 | 3 |
| | MBS polymer | | | | | | | | | |
| | Chlorinated polyethylene | 3 | | | | | | | | |
| Heat stabilizer | Sn-based stabilizer | 2 | 2 | 2 | 2 | 2 | 2 | 2 | 2 | 2 |
| | Ca soap | 2 | 2 | 2 | 2 | 2 | 2 | 2 | 2 | 2 |
| Lubricant | Paraffin wax | 1 | 1 | 1 | 1 | 1 | 1 | 1 | 1 | 1 |
| | Polyethylene wax | 0.15 | 0.15 | 0.15 | 0.15 | 0.15 | 0.15 | 0.15 | 0.15 | 0.15 |
| Manufacturing conditions | Mixer rotation speed (rpm) | 1,800 | 1,800 | 1,800 | 2,400 | 1,200 | 1,800 | 1,800 | 1,800 | 1,800 |
| | Preliminary melt processing | Roll | Roll | Roll | Roll | Roll | Roll | Roll | Extrusion | None |
| | Main molding processing | Press | Press | Press | Press | Press | Press | Press | Extrusion | Extrusion |
| Evaluation of physical properties | Charpy impact strength (kJ/m$^2$) | 85.5 ○ | 91.8 ○ | 97.2 ○ | 97.2 ○ | 62.0 ○ | 24.3 ○ | 82.5 ○ | 87.2 ○ | 25.5 ○ |
| | Chemical resistance: weight reduction ratio (mg/cm$^2$) | 0.77 ○ | 0.82 ○ | 0.83 ○ | 0.88 ○ | 0.86 ○ | 0.87 ○ | 0.84 ○ | 0.84 ○ | 0.87 ○ |

TABLE 3

| | | Comparative Example | | | | | |
|---|---|---|---|---|---|---|---|
| | | 1 | 2 | 3 | 4 | 5 | 6 |
| Resin compounding (parts by weight) | Polyvinyl chloride resin | 100 | 100 | 100 | 100 | 100 | 100 |
| Calcium carbonate | (I) Particle size 0.15 μm | 10 | | | | 20 | 10 |
| | (II) Particle size 0.10 μm | | | | | | |
| | (III) Particle size 0.08 μm | | | | | | |

TABLE 3-continued

|  |  | Comparative Example | | | | | |
| --- | --- | --- | --- | --- | --- | --- | --- |
|  |  | 1 | 2 | 3 | 4 | 5 | 6 |
| Impact modifier | Acrylic rubber | 3 | 3 |  |  | 3 |  |
|  | MBS polymer |  |  | 3 |  |  |  |
|  | Chlorinated polyethylene |  |  |  | 3 |  |  |
| Heat stabilizer | Sn-based stabilizer | 2 | 2 | 2 | 2 | 2 | 2 |
|  | Ca soap | 2 | 2 | 2 | 2 | 2 | 2 |
| Lubricant | Paraffin wax | 1 | 1 | 1 | 1 | 1 | 1 |
|  | Polyethylene wax | 0.15 | 0.15 | 0.15 | 0.15 | 0.15 | 0.15 |
| Manufacturing conditions | Mixer rotation speed (rpm) | 400 | 1,800 | 1,800 | 1,800 | 1,800 | 1,800 |
|  | Preliminary melt processing | Roll | Roll | Roll | Roll | Roll | Roll |
|  | Main molding processing | Press | Press | Press | Press | Press | Press |
| Evaluation of physical properties | Charpy impact strength (kJ/m$^2$) | 18.2 X | 17.4 X | 15.8 X | 11.5 X | 81.9 ○ | 16.7 X |
|  | Chemical resistance: weight reduction ratio (mg/cm$^2$) | 0.83 ○ | 0.33 ○ | 0.40 ○ | 0.19 ○ | 1.61 X | 0.70 ○ |

Details of resin compounding in the above Tables 1 to 3 are as follows.

Polyvinyl chloride resin: "TK-1000" (manufactured by Shin-Etsu Chemical Co., Ltd., average polymerization degree: 1,000)

Heat stabilizer: Sn-based stabilizer (octyltin mercapto or butyl tin sulfide)

Ca soap: calcium stearate

Lubricant: paraffin wax or polyethylene wax (oxidation type)

Calcium carbonate: Any one of the following three types of colloidal calcium carbonate (I) to (III) is used.
  (I) Fatty acid surface-treated product having an average primary particle size of 0.15 μm
  (II) Fatty acid surface-treated product having an average primary particle size of 0.10 μm
  (III) Fatty acid surface-treated product having an average primary particle size of 0.08 μm
  (The fatty acid used for the surface treatment of calcium carbonate is a mixture of fatty acids typified by stearic acid, palmitic acid, lauric acid, and oleic acid.)

MBS polymer (methyl methacrylate-butadiene-styrene graft copolymer):
  "B-562" (manufactured by Kaneka Corporation, D50=215 μm, butadiene content: 70 wt %)

Acrylic rubber: "FM-50" (manufactured by Kaneka Corporation.
  MMA graft acrylic rubber. D50=173 μm)

Chlorinated polyethylene: "ELASLEN 351A" [manufactured by Showa Denko K.K., chlorine content: 35 wt %, Mooney viscosity 90 M (121° C.)]

The results in Tables 1 and 2 indicate that in Examples 1 to 17, due to the addition amount of each of the impact modifier and calcium carbonate within a predetermined range, a polyvinyl chloride-based resin molded product in which the Charpy impact strength at 23° C. is 20 kJ/m$^2$ or more and a weight reduction ratio is 1.5 mg/cm$^2$ or less when the molded product is immersed in a 93% by weight sulfuric acid aqueous solution for 14 days can be obtained.

In addition, the results in Table 3 indicate that in Comparative Examples 1 to 6, in a case where each of the impact modifier and calcium carbonate is used singly, or in a case where the addition amount of calcium carbonate is large, physical property values that the Charpy impact strength at 23° C. is 20 kJ/m$^2$ or more and a weight reduction ratio is 1.5 mg/cm$^2$ or less when the molded product is immersed in a 93% by weight sulfuric acid aqueous solution for 14 days cannot be obtained.

Japanese Patent Application No. 2017-198973 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A polyvinyl chloride-based resin molded product obtained by molding a resin mixture containing 3 to 15 parts by weight of calcium carbonate having a number average primary particle size of 0.01 to 0.3 μm and 2 to 4 parts by weight of an impact modifier per 100 parts by weight of a polyvinyl chloride-based resin, wherein a Charpy impact strength at 23° C. is 20 kJ/m$^2$ or more, and a weight reduction ratio is 1.5 mg/cm$^2$ or less when the molded product is immersed in a 93% by weight sulfuric acid aqueous solution for 14 days in accordance with JIS K 6745.

2. The polyvinyl chloride-based resin molded product of claim 1, wherein the impact modifier is at least one resin material selected from the group consisting of a methyl methacrylate-butadiene-styrene graft copolymer (MBS polymer), an acrylic rubber, and a chlorinated polyethylene.

3. The polyvinyl chloride-based resin molded product of claim 1, used for a product selected from the group consisting of a pipe, a joint, a drainage basin, a gutter, a window frame, a siding, a film-sheet material, a flat plate, and a corrugated plate.

4. A method for manufacturing a polyvinyl chloride-based resin molded product, wherein a resin mixture containing 3 to 15 parts by weight of calcium carbonate having a number average primary particle size of 0.01 to 0.3 μm and 2 to 4 parts by weight of an impact modifier per 100 parts by weight of a polyvinyl chloride-based resin is mixed at a rotational speed of 500 to 3,000 rpm and molded by a molding method selected from the group consisting of extrusion molding, press molding, injection molding, and calender molding to obtain a resin molded product in which a Charpy impact strength at 23° C. is 20 kJ/m$^2$ or more, and a weight reduction ratio is 1.5 mg/cm$^2$ or less when the molded product is immersed in a 93% by weight sulfuric acid aqueous solution for 14 days.

* * * * *